July 7, 1970   L. W. TAYLOR   3,519,560
METHOD AND APPARATUS FOR REMOVING WATER FROM FLUIDS
Filed Oct. 2, 1967   3 Sheets-Sheet 1

INVENTOR.
LUCIAN W. TAYLOR
BY
Wilson & Fraser
ATTORNEYS

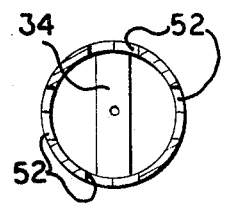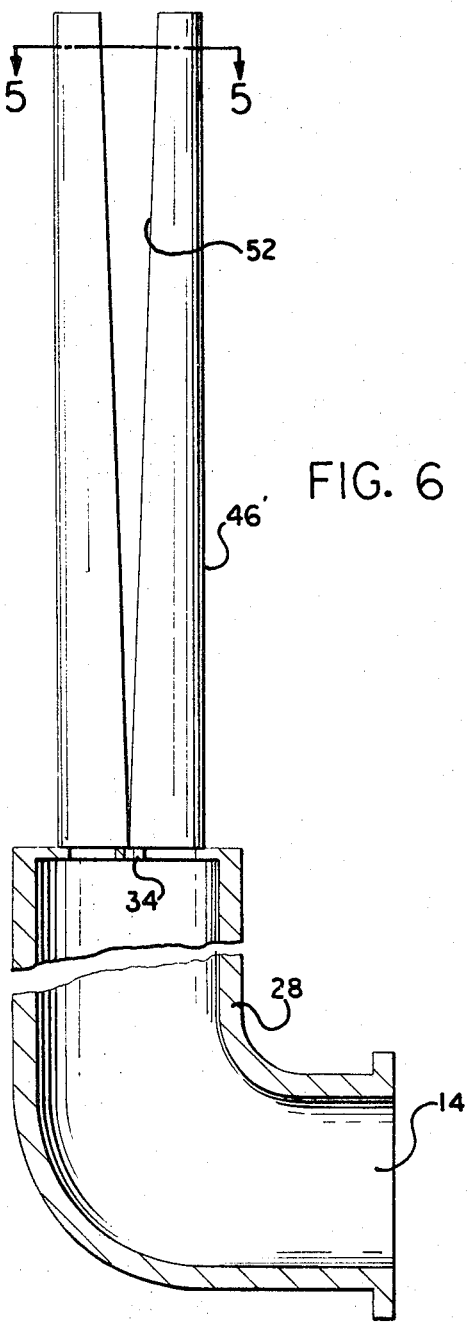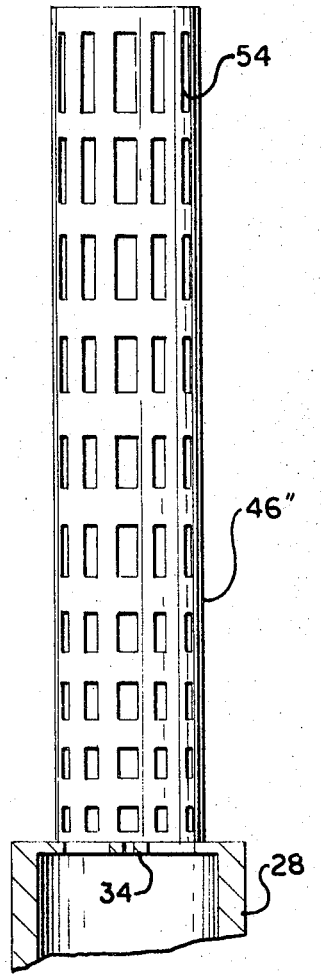

July 7, 1970    L. W. TAYLOR    3,519,560
METHOD AND APPARATUS FOR REMOVING WATER FROM FLUIDS
Filed Oct. 2, 1967    3 Sheets-Sheet 3
FIG. 7
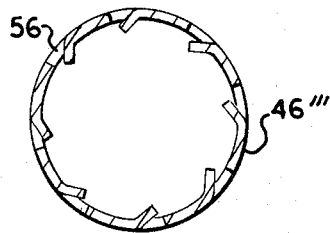
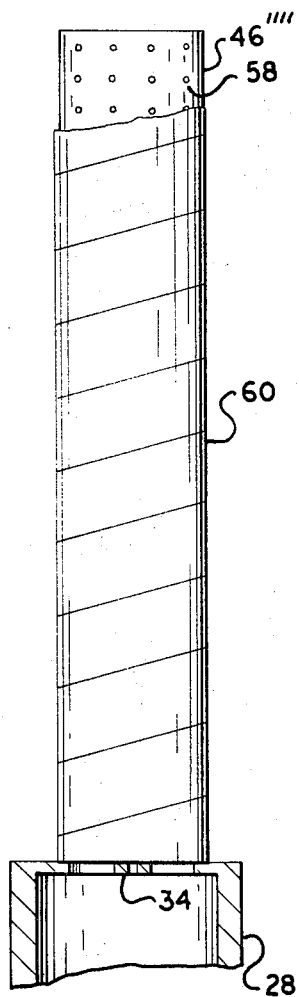
FIG. 8
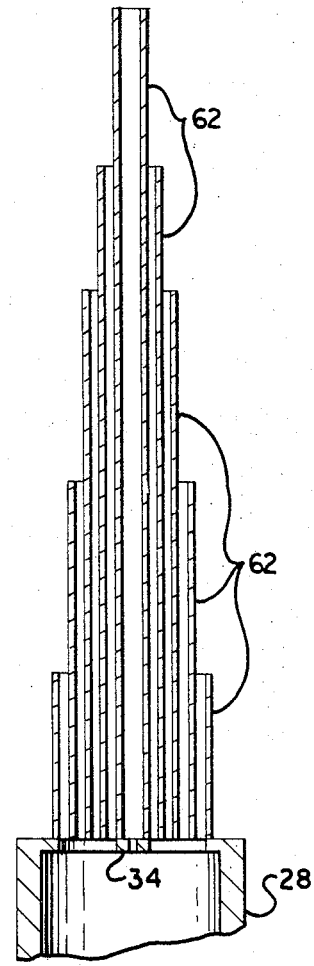
FIG. 9
INVENTOR.
LUCIAN W. TAYLOR
BY
Wilson & Fraser
ATTORNEYS United States Patent Office 3,519,560
Patented July 7, 1970

3,519,560
METHOD AND APPARATUS FOR REMOVING WATER FROM FLUIDS
Lucian W. Taylor, Los Altos, Calif., assignor to Filters, Inc., San Jose, Calif., a corporation of California
Filed Oct. 2, 1967, Ser. No. 672,233
Int. Cl. B01d 29/42
U.S. Cl. 210—316                          8 Claims

ABSTRACT OF THE DISCLOSURE

A filter separator assembly employing a separator element for separating water from hydrocarbon liquids wherein the separator element is formed of a material which militates against the passage of water therethrough while allowing the passage of a hydrocarbon fluid therethrough and is provided with means to effect a substantially uniform fluid flow therethrough throughout the entire length thereof.

BACKGROUND OF THE INVENTION

In apparatus designed and constructed for use in purifying fuels used in aircraft engines, for example, it is of utmost importance that the apparatus be effective in filtering and dehydrating such fuels so as to positively assure freedom from failure of engine parts which would cause engine failures or erratic operation, incomplete combustion, corrosion, and undue accumulation of carbon deposits frequently resulting from the presence of sludge and water.

Typically, apparatus designed to achieve the desired objectives of purifying aircraft fuels is comprised of two stages; namely, a coalescing and filtering stage, and a water separating stage. The apparatus is arranged wherein the coalescing and filtering elements and the separating elements are disposed vertically or horizontally within a corresponding filter separator housing or vessel. The fluid being treated is initially caused to be passed through the colescing stage which removes particulate contaminants and coalesces any water content therein. Then, the fluid is passed to an outlet through the separating stage which is pervious to the fluid being treated and impervious to water and thereby militates against the passage of any water therethrough. The coalesced water content tends to drop, by gravity, to the bottom of the housing and is suitably discharged therefrom. The size of the overall filter separator apparatus has a certain relationship to the gallons per minute of fluid which may be treated thereby.

In separating water from hydrocarbon fluids, there is a definite relationship between the surface area of the hydrophobic separating media and the velocity of the fluid being treated passing across it. In the event the velocity of the transient fluid increases beyond a certain point for a given apparatus, the pressure drop across the media becomes great enough to force small coalesced water droplets therethrough. Accordingly, there must be a sufficiently large area of separating media to separate the water from the fluid for a given flow rate.

Depending upon the rating of the filter separator, the vessel must contain a certain number of square inches of separating area, as well as, a certain number of coalescing elements. The fewer the number of separators that can be employed to achieve the desired rating, the smaller the containing vessel. It is known that enlarged surface areas can be achieved by pleating a cyclindrical coalescing element. However, pleated separating elements have not been successfully employed in attempts to reduce the ratio of the number of separator elements to the number of coalescer elements due, in large part, to an unequal pressure drop of the fluid along the length of the separating elements resulting in a passage of water therethrough at the high pressure zones and a resultant failure of the system.

It has been found that in the operation of filter separator assembles employing the usual considerably porous separating media for the separating elements, the velocity of the fluid passing through the elements adjacent the outlet was very high. In this high velocity zone, a pressure drop was established which was above the maximum pressure drop for restricting the flow of water through the separating media and caused a "breakthrough" of water through the separator element. The practice typically followed to overcome this problem has been to introduce a sufficient amount of additional separating media to reduce the velocity of the fluid across the entire outer surface of the separator elements to an acceptable limit whereby all water would be satisfactorily blocked thereby. Obviously, the additional separating media requires a corresponding larger vessel.

It is an object of the present invention to improve the water separating rating of a filter separator by reducing the size and/or number of the separating vessels and thereby reducing the overall dimensions of the containing vessel. The above object is achieved by providing means for effecting a substantially uniform distribution of the flow of the fluid being treated across the entire surface of the separating media whereby the presure drop across the separating media is maintained below that level which would cause a "break-through" of water.

SUMMARY

The present invention contemplates a filter separator assembly for removing contaminants from fluids containing a water content including a vessel having an inlet and an outlet, a filtering and coalescing stage between the inlet and the interior of the vessel, and a separating stage between the interior of the vessel and the outlet, the improvement comprising: at least one separating element in the separating stage having a first face in communication with the interior of the vessel and a second face in communication with the outlet of the vessel, and means for effecting a uniform distribution of the flow of fluid through the element across the first face of the separating element.

BRIEF DESCRIPTION OF THE DRAWINGS

The above objects and advantages of the invention will become readily apparent from reading the following detailed description of an embodiment of the invention when considered in the light of the accompanying drawing, in which:

FIG. 4 is an enlarged elevational view of a modification of the center tube configuration of the separator element illustrated in FIGS. 1, 2, and 3;

FIG. 5 is a sectional view of the center tube illustrated in FIG. 4 taken along line 5—5 thereof;

FIG. 6 is an enlarged elevational view of a modification of the center tube illustrated in FIGS. 4 and 5;

FIG. 7 is a cross sectional view of a center tube structure similar to the structure illustrated in FIG. 6;

FIG. 8 is an elevational view of a modification of the center tube structure wherein the outer surface is provided with a helical wrap of porous filter paper which varies in density across the length thereof; and FIG. 9 is an elevational view of another modified form of the center tube structure.

DESCRIPTION OF PREFERRED EMBODIMENTS OF THE INVENTION

Figure 1:
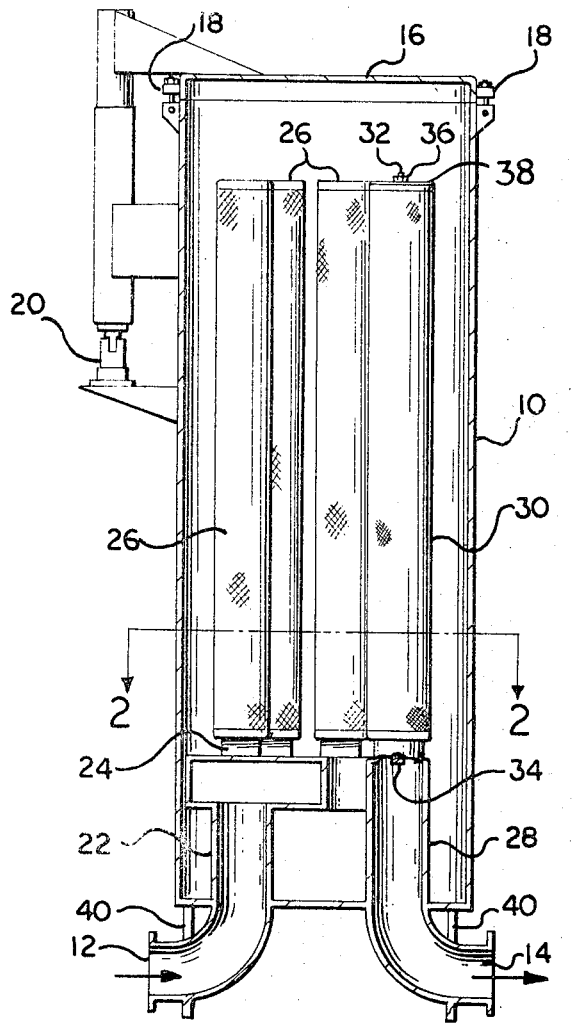
FIG. 1 is an elevational sectional view of a filter separator assembly incorporating apparatus of the invention.
Figure 3:
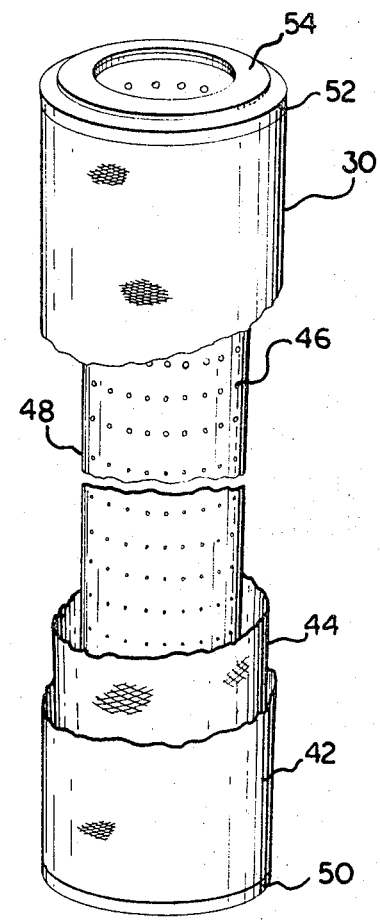
FIG. 3 is an enlarged perspective view partially cutaway of the separator element illustrated in FIGS. 1 and 2.
Figure 2:
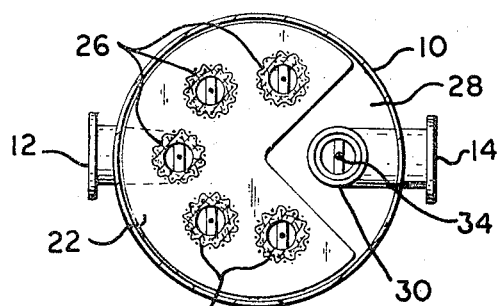
FIG. 2 is a sectional view of the assembly illustrated in FIG. 1 taken along line 2—2 thereof.

Referring to FIGS. 1, 2, and 3, there is illustrated a filter separator assembly including a vertically extending cylindrical vessel or container 10 having an inlet port 12 and an outlet port 14 disposed at the bottom of the vessel. The open top of the vessel 10 is provided with a top closure lid 16 which is fastened to the vessel by means of a plurality of swing bolt units 18. When the swing bolt units 18 are loosened, the lid 16 may be lifted and swung away from the vessel by a lid lifting device 20 to provide ready access to the interior of the vessel. At the bottom of the vessel 10, there is an inlet manifold 22 in fluid communication with the inlet port 12 and provided with a plurality of upstanding externally threaded nipples 24. The externally threaded nipples 24 threadably receive the internally threaded end cap members of a plurality of upstanding cylindrical filter and coalescer cartridges 26.

Adjacent the inlet manifold 22, there is disposed an outlet pipe 28 in fluid communication with the outlet port 14. An upstanding cylindrical separator element is suitably bolted in fluid communication with the outlet pipe 28 by means of an elongated bolt 32 which extends through a spider element 34 in the open end of the pipe 28 and thence through the hollow interior of the separator element 30 and has a threaded nut 36 at the upper extremity thereof. The nut 36 suitably secures an end plate 38 against gasket means at the top of the separator element 30 to provide a liquid tight seal therebetween. Suitable gasket means are likewise provided between the lower portion of the separator 30 and the upper open end of the outlet pipe 28.

The vessel or container 10 is supported by any suitable legs 40 secured to the exterior of the vessel in any well known manner.

The filtering and coalescing cartridges 26 are preformed and are typically comprised of a convolute tube or cylinder of fiber glass material bonded together by a resin binder. The fiber glass cylinder is then provided with a closed plastic end cap at the top and a hollow internally threaded end cap at the bottom. The cartridges 26 are typically designed for inside-out flow of the fluid being treated.

The separator element 30 is typically formed of an outer layer 42 of screen material of a mesh between 100 and 600 rating and coated with a hydrophobic material such as, for example, a fluorocarbon plastic. The outer surface of the layer 42 is in communication with the interior of the vessel 10. Spaced slightly inwardly from the layer 42 of coated screen material, there is a second layer 44 of screen material typically of a substantially greater mesh size than the screen material of the layer 42. The layer 44 is employed in the operation of the separator element to militate against any tendency of the outer layer 42 to collapse. Spaced inwardly of the layer 44 is a perforated metal tube 46 having a plurality of holes 48 formed throughout the entire surface thereof. The holes 48 are graded from a size having a relatively small diameter adjacent the lower terminal end thereof to a larger diameter adjacent the opposite end. It has been found that in a separator element thirty six inches in length and six and one half inches in diameter, the holes 48 were graded from a small size of .09 inch to a large size of .30 inch. The inner face of the perforated tube 46 is in communication with the outlet 14.

The opposite ends of the above described assemblage are provided with annular end caps 50 and 52 which are secured to the respective ends of the assemblage of the layers 42, 44, and the center tube 46. The exposed end of each of the end caps 50 and 52 is provided with an annular gasket 54, only a single one being shown in FIG. 3.

In operation, the influent to be treated is directed into the system through the inlet port 12, the influent which is typically an emulsion of hydrocarbon fuel and water is directed into the inlet manifold 22 and thence into the interior of the filtering and coalescing cartridges 26. As the fluid flows through the fibrous media of the cartridges 26, particulate contaminants are trapped therein and the emulsion is broken down and the water content is coalesced into small water droplets. These small water droplets tend to gravitate toward the bottom of the vessel 10 and are discharged through suitable valved discharge assembly, not shown. After passing through the cartridges 26, the fluid is directed into the interior of the vessel 10 and thence to the separating element 30. The screen layer 42, being substantially pervious to a hydrocarbon fluid and impervious to water, will allow the clean dry fluid to pass through the screen layer 42 while militating against the passage of any water droplets which may not have dropped to the bottom of the vessel 10 and have been carried by the transient fluid to the screen layer 42 of the separator 30. The clean dry fluid passes through the screen 44, through the perforations in the tube 46 and thence to the outlet port 14 through the outlet pipe 28.

It has been found in practice that with the center tube 46 having perforations therein of the same diameter throughout, an unequal distribution of fluid flow occurred along the length of the separator causing the fluid flowing through the separator in the vicinity of the outlet to have an extremely high velocity with respect to the velocity of the fluid flowing through the separator at the opposite end. Accordingly, the pressure drop across the separator element 30 caused by the varying velocity of the fluid therethrough varied along the longitudinal length thereof with the pressure drop at the bottom of the outlet thereof to be above the desired maximum. Such a condition caused the water collected at the bottom of the separator element to be forced through the screen layer 42 allowing water to be present in the effluent passing through the outlet port 14 resulting in a consequent failure of the system. It has been found that by employing a means to resist the flow of fluid through the separator 30 to provide for substantially uniform distribution of the flow of fluid thereacross, the pressure drop along the entire length of the separator media would be controlled to be substantially equal, thereby militating against the passage of any water content through the separator media and achieving a separator element of increased efficiency and effectiveness. It will be appreciated that the graded porosity or open area formed by the apertures of holes 48 in the center tube 46 will effectively cause a substantial equalization in the distribution of the velocities of the fluid passing through the screen layer 42 to the interior of the tube 46 and thence to the outlet 14.

It will be understood that the separator element 30 illustrated in FIGS. 1, 2, and 3 is formed as a completely unitary structure; however, it is contemplated that the center tube 46 could likewise be successfully formed as an integral part of the outlet pipe 28. FIGS. 4, 5, 6, 7, 8, and 9 disclose various modifications of the configuration of the center tube structure for effecting a substantially uniform distribution of the flow of fluid through the separator element across the entire surface thereof wherein the center tube is formed as an integral part of the outlet pipe 28.

With specific reference to FIGS. 4 and 5, there is illustrated a center tube 46′ which is fixedly secured as by welding, for example, to the upper open end of the outlet pipe 28. The center tube 46′ is typically formed of a sheet metal material and has quadrantly displaced elongate V-shaped slots 52 which are substantially coextensive with the length of the tube. It will be appreciated that the completed separator assembly would include an outwardly disposed spaced apart screen layer assembly as the screen layers 42 and 44 of the separator illustrated in FIGS. 1, 2, and 3. The screen assembly would be maintained in fixed position by a bolt extending through the spider element 34 and an end plate arrangement similar to that illustrated in FIG. 1. The opening in the center tube provided by the slots 52 gradually increase from the bottom of the center tube to the top thereof and function to produce a substantially uniform distribution of the flow of fluid across the separator element in a manner similar to that explained with reference to the operation of the embodiment illustrated in FIGS. 1, 2, and 3.

FIG. 6 illustrates an embodiment of the invention similar to the embodiment illustrated in FIGS. 4 and 5, wherein there is a center tube 46" fixedly secured to the open end of the outlet pipe 28. The center tube 46" is formed of a sheet metal material and is provided with a plurality of slots 54 arranged to increase in both length and width dimensions from the bottom to the top of the tube. While the center tube 46" is illustrated as being fixedly secured to the open end of the pipe 28 and is adapted to receive a screen assembly essentially in the same manner as explained with reference to the embodiment illustrated in FIGS. 4 and 5, it must be understood that the center tube 46" could likewise be formed as an integral part of the separator element in the same fashion as provided in embodiment illustrated in FIGS. 1, 2, and 3. In operation, the slotted center tube 46" functions to produce a substantially uniform distribution of the flow of fluid across the length of the separator element to effectively achieve the maximum water separating efficiency thereof.

Another embodiment of the invention is illustrated in FIG. 7 wherein there is illustrated a center tube 46''' having a plurality of tangentially formed openings or slots 56 which are designed to increase in both length and width dimensions from the bottom to the top of the associated tube. These slots 56 function in the same manner as the apertures and slots described hereinbefore with reference to the embodiments of the invention illustrated in FIGS. 1 through 6, and additionally will tend to effect a somewhat tangential type of flow of the fluid passing through the separator to the outlet pipe 28. It will be appreciated that in forming the slots 56 there can be some economies appreciated in production since it would be necessary to only vary the amount to which the material forming the slots is to be forced inwardly to effect the desired open area.

In FIG. 8, there is illustrated another embodiment of the invention wherein the center tube 46'''' of the separator element is formed of a perforated metal sleeve 58 having a helical wrap 60 of filter paper. The helically wrapped layer of filter paper 60 is formed to be more dense near the bottom or outlet end thereof and is gradually graded toward less density as the helical wrap approaches the upper end of the sleeve 58. Typically, the perforations in the sleeve 58 are not varied in size and may be evenly distributed across the entire surface of the sleeve. The graded density of the embodiment illustrated in FIG. 8 may be achieved by employing a filter paper of constant porosity and effecting a greater number of wraps of the material adjacent one end as compared to the number of wraps at the opposite end. Alternatively, the desired objectives of the invention could be achieved by employing a filter paper having a varying porosity throughout the length thereof.

Another embodiment of the invention is illustrated in FIG. 9 wherein the center tube structure is formed of a plurality of upstanding coaxially arranged standpipes 62 of increasing lengths and decreasing diameters from the bottom or outlet end to the top thereof. As in the other above described embodiments, the outer screen layers of the separator assembly are assembled in spaced relation above the center tube structure of the coaxially arranged standpipes 62.

While specific reference has been made to forming the screen layer 42 in a smooth cylindrical form, it will be appreciated that certain increased capacities of the separator element 30 could be achieved by pleating the layer 42 to increase the surface area of the separating media 42. In each of the embodiments of the invention, it will be appreciated that there has been provided a separating element for a filter separator assembly having means for militating against the passage of water therethrough while allowing the passage of hydrocarbon fluids therethrough, and means for effecting a uniform distribution of the flow of fluid through the separator element across the entire surface thereof whereby the pressure drop of the fluid across the separator element is substantially uniform throughout the entire length thereof to thereby effect a more efficiently operated separating system.

It is believed that the separator elements embodied in the concept of this invention should have a length to diameter ratio of the screen layer exceeding 1.5 to 1.

In accordance with the provisions of the patent statutes, I have explained the principle and mode of operation of my invention and have illustrated and described what I now consider to represent its best embodiments. However, it is to be understood that within the spirit and scope of the appended claims, the invention may be practiced otherwise than as specifically illustrated and described.

What I claim is:

1. In a filter separator assembly for removing contaminants from fluids including a vessel having an inlet and an outlet, a filtering and coalescing stage between the inlet and the interior of the vessel, and a separating stage between the interior of the vessel and the outlet, the separating stage including a separating element having an outlet passage in communication with the outlet of the vessel, the outlet passage having a portion proximate to the outlet of the vessel and a portion remote from the outlet of the vessel, an improved separator element comprising:

a first face exposed to the interior of the vessel, a second face exposed to the outlet passage, means between said first and second faces for militating against the passage of water therethrough while allowing the passage of hydrocarbon fluids therethrough, and means downstream of the first face apertured to provide a percentage of open area per unit of area which is graded in a decreasing manner toward the outlet for effecting a substantially uniform distribution of the flow of fluid between the first and second faces across the entire surfaces thereof whereby the pressure drop thereacross is substantially uniform.

2. The invention defined in claim 1 wherein said means downstream of the first face includes a sleeve of sheet material having a plurality of apertures therein.

3. The invention defined in claim 2 wherein said apertures define a fluid passage area at the end of said sleeve most adjacent the outlet is less than the fluid passage area at the other end.

4. The invention defined in claim 3 wherein said apertures adjacent the one end of said sleeve are of a diameter of the order of .09 inch and are graded to a diameter of the order of .30 inch at the other end of said sleeve.

5. The invention defined in claim 2 wherein said apertures are in the form of slots.

6. The invention defined in claim 2 including a wrap of filter paper on said sleeve, said filter paper having a first density adjacent one end of said sleeve and graded to a second decreased density adjacent the opposite end of said sleeve.

7. The invention defined in claim 1 wherein said means downstream of the first face of said separating element is in the form of a tube having quadrantly displaced elongated V-shaped slots.

8. The invention defined in claim 1 wherein said means downstream of the first face of said separating element consists of a plurality of coaxially arranged pipes of decreasing length and increasing diameters in the direction of the outlet.

References Cited

UNITED STATES PATENTS

| | | | |
|---|---|---|---|
| 2,197,252 | 4/1940 | Decker | 210—494 X |
| 2,891,674 | 6/1959 | Yelinek | 210—457 |
| 2,929,503 | 3/1960 | Ambruster et al. | |
| 2,960,234 | 11/1960 | Fredrickson | 210—457 |
| 3,016,345 | 1/1962 | Price. | |
| 3,182,800 | 5/1965 | Kasten et al. | 210—96 |
| 3,314,546 | 4/1967 | Briggs et al. | 210—457 |

JOHN W. ADEE, Primary Examiner

U.S. Cl. X.R.

210—457, 494, 489